July 29, 1958
H. C. SMITH
2,844,956
APPARATUS FOR TESTING HOT BLEED AND RUB PROPERTIES
OF PRINTED HEAT SEALABLE PAPER
Filed April 2, 1956
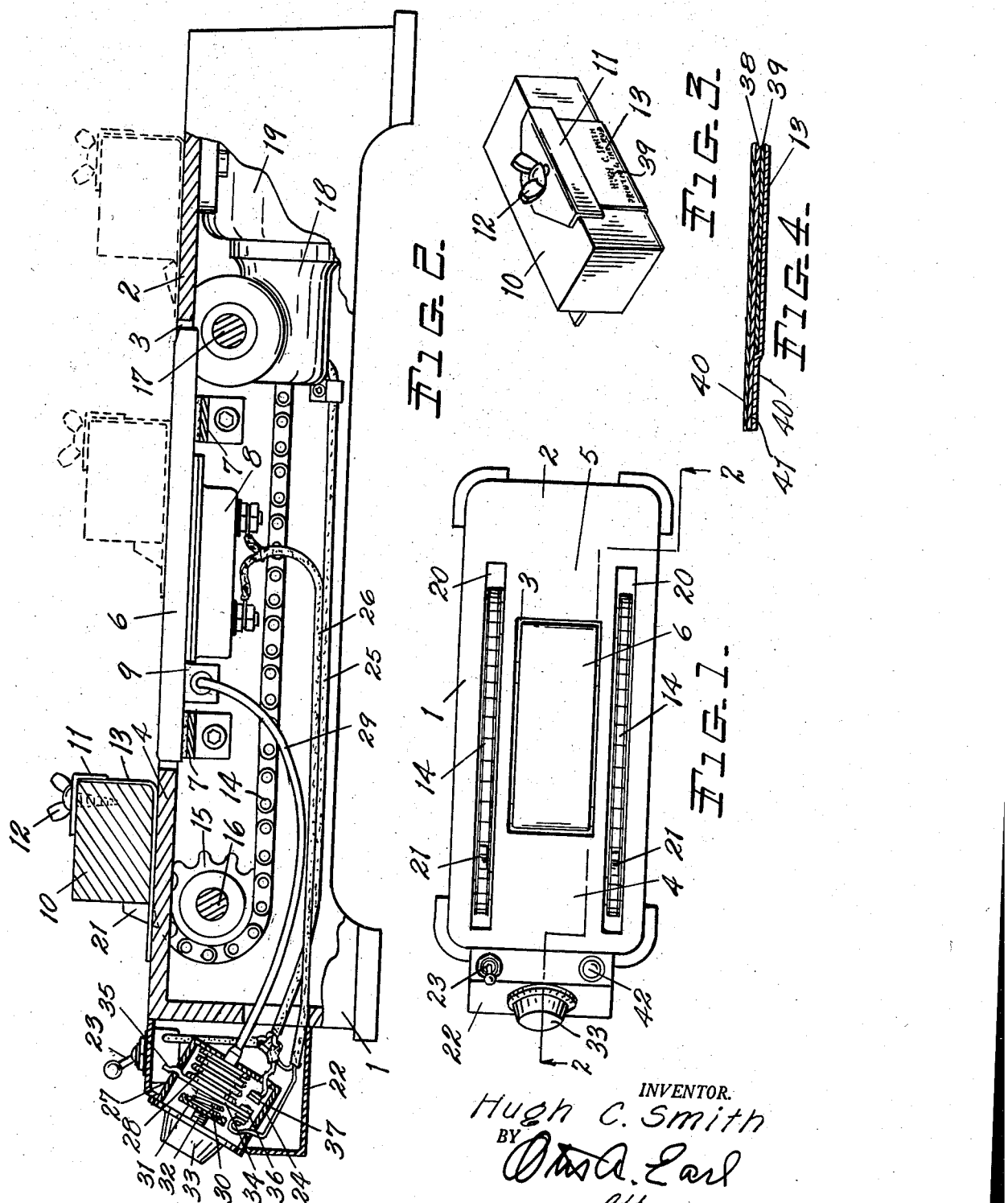
INVENTOR.
Hugh C. Smith
BY
Otis A. Earl
Attorney

United States Patent Office

2,844,956
Patented July 29, 1958

2,844,956

APPARATUS FOR TESTING HOT BLEED AND RUB PROPERTIES OF PRINTED HEAT SEALABLE PAPER

Hugh C. Smith, Parchment, Mich., assignor to Kalamazoo Vegetable Parchment Company, Parchment, Mich.

Application April 2, 1956, Serial No. 575,517

10 Claims. (Cl. 73—15.4)

This invention relates to improvements in apparatus for testing hot bleed and rub properties of printed heat sealable paper. The principal objects of this invention are:

First, to provide apparatus for predetermining how any paper printed with a given ink and provided with a thermosealing coating will react to elevated temperatures and rubbing conditions such as are encountered when the paper is sealed around a package in a wrapping machine.

Second, to provide apparatus for accurately repeating adjustably constant factors of temperature, time and pressure in a paper testing process.

Third, to provide a test for predetermining how a given sample of inked and waxed paper will react to high temperature, pressure and rubbing conditions when sealed around a package.

Fourth, to provide a test apparatus for testing inked waxed paper which are both simple and effective.

Other objects and advantages of the invention will be apparent from a consideration of the following description and claims. The drawings of which there is one sheet illustrate a highly practical form of the apparatus.

Fig. 1 is a plan view of the test apparatus.

Fig. 2 is an enlarged side elevational view partially broken away in vertical cross section on the line 2—2 in Fig. 1.

Fig. 3 is a perspective view of the sample translating block of the apparatus with a test sample secured thereto.

Fig. 4 is an exaggerated enlarged side elevational view of a test sample.

Many wrapping papers, of which bread wrappers are a familiar example, consist of paper sheet with printed patterns and indicia thereon and covered with a thermoplastic coating such as wax. When these wrappers are applied to articles such as a loaf of bread by automatic wrapping machines, the overlapped portions of the wrapper are translated across a heated plate so that the thermoplastic coating is softened to form a seal between the lapped portions of the wrapper. The colors and designs of the printed matter are determined by the customer's order, and it is a problem of the manufacturer of the wrapper to provide a wrapper sheet in which the ink of the printed matter will not bleed or smear over unprinted areas when the package and wrapper are sealed in the wrapping process. The present invention provides apparatus and procedural steps by which the bleed and smear resistant properties of different wrappers, inks and thermoplastic coatings may be tested.

The apparatus includes a base 1 which is a box shaped oblong cabinet having a top wall 2. The center of the top wall defines an oblong opening 3 of the order of 12 inches long by 4 inches wide. The ends of the top wall 2 form a receiving rest area 4 ahead of the opening and a discharge rest area 5 behind the opening 3. Positioned in the center opening 3 is a flat hot plate 6 supported by cross bars 7 located within the box-like base. The hot plate 6 substantially fills the opening 3 and has smoothly rounded edges that desirably project slightly above the level of the top wall 1.

Secured to the underside of the hot plate 6 is one or more electrical heating elements 8 having sufficient capacity to uniformly heat the surface of the hot plate as high as 400° or 500° F. Also secured in heat transfer relation to the hot plate 6 is the temperature sensing element 9 of a thermostat to be described presently. Test samples are moved from the receiving rest area 4 across the hot plate to the discharge rest area 5 by a weighted block 10 having a flat undersurface that is proportioned to the weight of the block to provide a pressure of approximately 250 grams per square inch on the hot plate. The pressure block 10 is provided with a clamp 11 and thumb screw 12 for clamping a test strip of paper 13 over the lower surface of the block. Desirably the test strip 13 is the same width as the hot plate so as to maintain the calculated unit pressure of the block on the hot plate.

The test block is moved across the hot plate by means of a pair of conveyor chains 14 mounted on sprockets 15 underneath the top wall of the base. The sprockets 15 are connected and driven at the same speed by cross shafts 16 and 17. The shaft 17 is driven from suitable gearing in the gear box 18 of an electric motor 19. The upper reaches of the chains 14 project into the plane of the top wall 1 and the wall is provided with longitudinal slots 20 for receiving the chains. The chains each carry an outwardly or upwardly projecting lug 21 and the lugs are positioned in transverse alined relation to the base and constitute a flight for advancing the block 10. With reference to Figs. 1 and 3 it will be noted that the block 10 is considerably wider than the hot plate 6 to extend into the path of the flight lugs 21. The chains 14 and slots 20 extend alongside of the receiving rest area 4 and alongside of the hot plate 6 but terminate in the leading part of the rest area 5 so that as the lugs advance to the rest area 5 and retract downwardly below the top wall 2 the test block and sample are deposited in a stationary position on the rest area 5.

Secured to the front end of the base 1 is a control box 22 having an on-off switch 23 and a thermostatic switch 24 mounted therein. The switch 23 is connected directly to the motor 19 by a cable 25 but the cable 26 from the heating element 8 which also connects to the switch 23 is interrupted by the thermostatic switch 24. The thermostatic switch 24 is conventionally illustrated as including case 27 within which a bellows 28 is mounted and mechanically connected to the sensing element 9 by a capillary tube 29. The bellows 28 is restrained against expansion by a spring 30 backed up by a centering plate 31 and an adjusting screw 32 connected to the control knob 33. A switch arm 34 is pivoted to one side of the case as at 35 and extends across the bellows to be actuated thereby. The switch arm 34 carries a movable contact 36 that moves toward and away from a first contact 37 under the influence of the bellows and the spring.

Setting of the temperature control switch 33 to different temperatures controls the temperature of the hot plate by turning the heating element 8 off and on.

The test sample 13 consists of a sheet or strip of paper 38 of the type proposed to be used in the wrapper or for other purposes. A sample of the ink to be used is printed on the sheet as at 39 with a portion of the end of the sheet left unprinted. The thermoplastic coating on one or both sides of the sheet is indicated at 40. It will be appreciated that the thickness of the printed area and the thickness of the thermoplastic coating are greatly exaggerated in Fig. 4.

In testing the sample sheet 13 with the apparatus disclosed, the test sheet is clamped to the block 10 with a substantial portion of the printed area 39 disposed along the undersurface of the block but also with the unprinted area 41 located under the block to be subject to the same temperature and pressure conditions as the trailing portion of the printed area. The switch 23 is turned on and the thermostatic switch is adjusted to the desired temperature and if the hot plate has reached the predetermined temperature, the test block and sheet are placed on the receiving rest area 4. On the next revolution of the conveyor chains 14, the flight lugs 21 engage the ends of the test block 10 and advance the test block and sheet across the hot plate. The speed of the motor 19 and of the gear box 18 is such as to rotate the chains and advance the pressure block across the hot plate 6 in a matter of about three seconds. The sample sheet can then be removed from the block and inspected and compared on other samples to determine the tendency, if any, of the ink to flow into the unprinted area 41 under the test conditions of temperature, pressure and time of contact with the hot plate.

As was explained the lugs 21 automatically release themselves from the block 10 by retracting into the base so the time interval contact of the test sheet with the hot plate is predetermined by the speed and size of the sprockets 15. In order to determine when the hot plate has reached the desired temperature a signal lamp 42 is provided on the control box. After the sample has been translated across the hot plate it is removed from the block and inspected for hot bleed or rub and should these conditions exist either the ink formula or the thermoplastic coating formula may be changed to eliminate the objectional properties of the wrapper.

Having thus described the invention, what is claimed as new and is desired to be secured by Letters Patent is:

1. Hot bleed and rub testing apparatus for printed paper comprising a base, a hot plate set into the surface of said base with unheated rest areas at each end of the plate, a pair of chain loops rotatably mounted below said base with their upper reaches extending alongside said plate and the first of said rest areas, a pair of projections on said chains arranged to project above said surface and plate and be moved therealong in side by side relation, a motor connected to drive said chains and move said projections past said plate in a time of the order of three seconds, said plate being of the order of 12 inches long, a heating element on the underside of said plate arranged to heat the plate, a switch connected to energize said motor and said heating element, an adjustable thermostatically controlled switch responsive to the temperature of said plate and electrically connected between said first switch and said element to control the temperature of said plate, and a pressure block having a flat under surface and weight proportioned to create a pressure of the order of 250 grams per square inch on said plate, said block extending beyond said plate to be engaged by said projections and having a clip for removably holding a test sheet of paper in lapped relation to said flat surface, said block being narrower than said rest areas to be supported on the rest areas with the test sheet out of contact with said plate.

2. Hot bleed and rub testing apparatus for printed paper comprising a base, a hot plate set into the surface of said base with unheated rest areas at each end of the plate, a pair of chain loops rotatably mounted below said base with their upper reaches extending alongside said plate and the first of said rest areas, a pair of projections on said chains arranged to project above said surface and plate and be moved therealong in side by side relation, a motor connected to drive said chains, a heating element arranged to heat the plate, a switch connected to energize said motor and said heating element, an adjustable thermostatically controlled switch responsive to the temperature of said plate and electrically connected to control the temperature of said plate, and a pressure block having a flat under surface to create a pressure on said plate, said block extending beyond said plate to be engaged by said projections and having a clip for removably holding a test sheet of paper in lapped relation to said flat surface, said block being narrower than said rest areas to be supported on the rest areas with the test sheet out of contact with said plate.

3. Hot bleed and rub testing apparatus for printed paper comprising a base having a flat hot plate supported therein and exposed along the surface of the base slightly above the base, rest areas on said base at each end of said plate, a pressure block having a flat undersurface slidable in supported contact with said plate and adapted to be supported on said rest areas out of contact with the plate, a conveyor in said base having a flight engageable with said block, said flight being extensible by said conveyor through a slot in said base ahead of one of said rest areas and along the rest area and said plate and retractable into said base ahead of the other of said rest areas whereby the flight will move the test block from one rest area across the plate and deliver the block to the other rest area, means for maintaining said plate at an adjustably constant temperature, and a drive means on said base connected to drive said conveyor and said flight at at a fixed speed.

4. Hot bleed and rub testing apparatus for printed paper comprising a base having a hot plate supported therein and exposed along the surface of the base, rest areas on said base at each end of said plate, a pressure block having an undersurface slidable in supported contact with said plate and adapted to be supported on said rest areas out of contact with the plate, a conveyor in said base having a flight engageable with said block, said flight being extensible by said conveyor through a slot in said base ahead of one of said rest areas and along the rest area and said plate and retractable into said base ahead of the other of said rest areas whereby the flight will move the test block from one rest area across the plate and deliver the block to the other rest area, means for maintaining said plate at an adjustably constant temperature, and a drive means on said base connected to drive said conveyor and said flight at a fixed speed.

5. Hot bleed and rub testing apparatus for printed paper comprising a base having a hot plate supported therein and exposed along the surface of the base, rest areas on said base at each end of said plate, a pressure block having an undersurface slidable in supported contact with said plate and adapted to be supported on said rest areas out of contact with the plate, a conveyor in said base having a flight engageable with said block ahead of one of said rest areas and along the rest area and said plate and retractable out of engagement with the block ahead of the other of said rest areas whereby the flight will move the test block from one rest area across the plate and deliver the block to the other rest area, means for maintaining said plate at an adjustably constant temperature, and a drive means on said base connected to drive said conveyor and said flight at a fixed speed.

6. Hot bleed and rub testing apparatus for printed paper comprising a base having a hot plate supported therein and exposed along the surface of the base, a rest area on said base at the leading end of said plate, a pressure block having an undersurface slidable in supported contact with said plate and adapted to be supported on said rest area out of contact with the plate, a conveyor in said base having a flight engageable with said block ahead of said rest area and along the rest area and said plate and retractable into said base whereby the flight will move the test block from the rest area across the plate, means for maintaining said plate at an adjustably constant temperature, and a drive means on said base connected to drive said conveyor and said flight at a fixed speed.

7. Hot bleed and rub testing apparatus for printed paper comprising a base having a hot plate supported therein and exposed along the surface of the base, a rest area on said base at the leading end of said plate, a pressure block having an undersurface slidable in supported contact with said plate and adapted to be supported on said rest area out of contact with the plate, a conveyor in said base having a flight engageable with said block ahead of said rest area and along the rest area and said plate whereby the flight will move the test block from the rest area across the plate, means for maintaining said plate at an adjustably constant temperature, and a drive means on said base connected to drive said conveyor and said flight at a fixed speed.

8. An ink testing apparatus comprising a flat faced way having a hot plate opening therein, there being a feed table portion at the front of said opening and a work receiving table portion at the rear thereof, said way having parallel longitudinally extending slots, one at each side of said hot plate opening, a hot plate arranged in said hot plate opening with its upper surface slightly above the plane of the way, a conveyor comprising conveyor chains provided with single transversely aligned flights disposed with their upper reaches in alignment with said slots so that said flights project therethrough on their rearward travel, said upper reaches extending both forwardly and rearwardly of the hot plate, and a work holder block of such length as to overlie said conveyor reaches when positioned upon said feed table portion of said way and be picked up by said flights, translated across the hot plate and delivered upon the receiving portion of said way.

9. An ink testing apparatus comprising a flat faced way having a hot plate opening therein, there being a feed table portion at the front of said opening, and a work receiving table portion at the rear thereof, said way having parallel longitudinally extending slots, one at each side of said hot plate opening, a hot plate arranged in said hot plate opening, a conveyor comprising endless conveyor members provided with single transversely aligned flights, disposed with their upper reaches in alignment with said slots so that said flights project therethrough on their rearward travel, said upper reaches extending both forwardly and rearwardly of the hot plate so that when positioned upon said feed table portion of said way is picked up by said flights, translated across the hot plate and delivered upon the receiving portion of said way.

10. An ink testing apparatus comprising a flat faced way having a hot plate opening therein, there being a feed table portion at the front of said opening, and a work receiving table portion at the rear thereof, said way having parallel longitudinally extending slots, one at each side of said hot plate opening, a hot plate arranged in said hot plate opening with its upper surface slightly above the plane of the way, a conveyor provided with a pair of transversely aligned flights projecting through said slots on the rearward travel thereof, said conveyor extending both forwardly and rearwardly of the hot plate, and a work holder block of such length as to overlie said slots when positioned upon said feed table portion of said way and be picked up by said flights, translated across the hot plate and delivered upon the receiving portion of said way.

References Cited in the file of this patent

UNITED STATES PATENTS

| | | |
|---|---|---|
| 2,113,290 | Benjamin | Apr. 5, 1938 |
| 2,530,257 | Marcus | Nov. 14, 1950 |
| 2,600,453 | Weingart | June 17, 1952 |
| 2,660,051 | Dowling | Nov. 24, 1953 |
| 2,734,375 | Galbraith et al. | Feb. 14, 1956 |